United States Patent [19]

Tsuboka

[11] Patent Number: 5,129,002

[45] Date of Patent: Jul. 7, 1992

[54] PATTERN RECOGNITION APPARATUS

[75] Inventor: Eiichi Tsuboka, Osaka, Japan

[73] Assignee: Matsushita Electric Industrial Co., Ltd., Osaka, Japan

[21] Appl. No.: 787,747

[22] Filed: Nov. 5, 1991

Related U.S. Application Data

[63] Continuation of Ser. No. 540,356, Jun. 19, 1990, abandoned, which is a continuation-in-part of Ser. No. 285,193, Dec. 15, 1988, abandoned.

[30] Foreign Application Priority Data

Dec. 16, 1987 [JP] Japan .................................. 62-318142
Jun. 27, 1988 [JP] Japan .................................. 63-158535

[51] Int. Cl.$^5$ .............................................. G10* 5/00
[52] U.S. Cl. .................................................... 381/43
[58] Field of Search ........................ 381/42, 43; 395/2

[56] References Cited

U.S. PATENT DOCUMENTS

| | | | |
|---|---|---|---|
| 4,780,906 | 10/1988 | Rajasekaran et al. | 381/43 |
| 4,783,802 | 11/1988 | Takebayashi et al. | 381/41 |
| 4,783,804 | 11/1988 | Juang et al. | 381/43 |
| 4,783,806 | 11/1988 | Nakamura et al. | 381/43 |
| 4,783,809 | 11/1988 | Glinski | 381/43 |
| 4,790,017 | 12/1988 | Hinton | 381/43 |

Primary Examiner—Emanuel S. Kemeny
Attorney, Agent, or Firm—Price, Gess & Ubell

[57] ABSTRACT

A pattern recognition apparatus using the hidden Markov model technique in which parameters for defining a mean vector representing the probability density function in each one of plural states for composing the hidden Markov model vary with time. Accordingly, the recognition precision may be enhanced when this apparatus is used in, for example, voice recognition.

16 Claims, 7 Drawing Sheets

PATTERN RECOGNITION APPARATUS

This is a continuation of application Ser. No. 540,356, filed on Jun. 19, 1990, for a Pattern Recognition Apparatus, abandoned, which is a continuation in part of Ser. No. 285,193 filed Dec. 15, 1998, abandoned.

BACKGROUND OF THE INVENTION

1. Field of the Invention apparatus using the Hidden Markov Model (HMM) in pattern recognition of voice or the like, and more particularly relates to an apparatus which is capable of fabricating HMM high in precision of recognition.

2. Description of the Prior Art

FIG. 1 is a block diagram of a conventional voice recognition apparatus employing HMM. In the diagram, numeral 101 denotes a voice analyzing part, in which an input voice signal is converted into a feature vector for a specified time interval (called a frame), for example, every 10 msec, by a well-known method such as, filter bank, Fourier transform and LPC analysis. Therefore, the input voice signal is converted into a sequence $X = x_1, x_2, \ldots, x_T$ of feature vectors, in which T is the number of frames. Numeral 102 is called a code book, which holds a labeled representative vector. Numeral 103 is a vector quantizing part, which replaces the individual vectors in the vector sequence X with the label of the closest representative vector. Numeral 104 is an HMM fabricating part, in which an HMM corresponding to each word in the recognition vocabulary is created from training data. That is, in order to make an HMM corresponding to word n, the structure of the HMM (the number of states or the transition rule permitted between states) is first properly determined, and from the label sequence obtained by multiple utterances of the word n in the above method, the probability of the label occurring along with the transition of the state or the state transition probability in the previous model is estimated so that the probability of the occurrence of the label sequence may be estimated. Numeral 105 is an HMM memory unit, which stores the thus obtained HMM in each word. Numeral 106 denotes a probability calculating part, which calculates the probability generated by the label sequence from the respective models stored in the HMM memory unit 105, with respect to the label sequence of the unknown input voice to be recognized. Numeral 107 is a comparator, which judges the word corresponding to the model giving the maximum value of the likelihood corresponding to the respective models obtained in the likelihood calculating part 106, as the result of recognition.

The recognition by HMM is effected in the following manner. Supposing the label sequence obtained with respect to an unknown input to be $o = o_1, o_2, \ldots, o_T$\, and an arbitrary state sequence of a length T generated by model $\lambda^w$ to be $S = s_1, s_2, \ldots, s_T$, the probability that the label sequence o was generated from $\lambda^w$ is given as follows:

[Strict solution]
$$L_1(w) = \sum_s P(O,S|\lambda^w) \quad (1)$$

[Approximate solution]

$$L_2(w) = \max_s [P(O,S|\lambda^w)] \quad (2)$$

In the case of equation (2), using the logarithm, it is often rewritten as $$L_3(w) = \max_s [\log\{P(O,S|\lambda^w)\}] \quad (3)$$

where $P(x,y|\lambda^w)$ is a simultaneous probability of x, y in model $\lambda^w$.

Therefore, for example, by using equation (1), supposing $$w = \underset{w}{\mathrm{argmax}}[L_1(w)] \quad (4)$$

ŵ is the result of recognition. The same holds true when equations (2) and (3) are employed.

$P(o,S|\lambda)$ is, in the case of equation (1), obtained as follows.

With respect to the state qi $(i=1 \sim I)$ of HMM$\lambda$, when the occurrence probability $b_i(o)$ of label o and the transition probability $a_{ij}$ from state $q_i$ to state $q_j$ are given in every state $q_i$, the probability of occurrence of label sequence $O = o_1 o_2, \ldots o_T$ from HMM$\lambda$ with respect to the state sequence $S = s_1, s_2, \ldots, s_{T+1}$ is defined as follows:

$$P(O,S|\lambda) = \prod_{t=1}^{T+1} a_{s_{t-1}s_t} \prod_{t=1}^{T} b_{s_t}(o_t) \quad (5)$$

where as is the initial probability of state $s_1$, and $s_{T+1} = q_r$ is the final state, where any label is not generated at all.

In this example, the input feature vector x is converted into a label, but it is also possible to use the feature vector x directly instead of the occurrence probability of the label in each state, and give the probability density function of the feature vector x. At this time, instead of the occurrence probability $b_i(o)$ in the state $q_i$ of the label o in equation (5), the probability density $b_i(x)$ of the feature vector x is used. Therefore, the equations (1), (2), and (3) are rewritten as follows:

[Strict solution]
$$L_1'(w) = \sum_s P(X,S|\lambda^w) \quad (1')$$

[Approximate solution]
$$L_2'(w) = \max_s [P(X,S|\lambda^w)] \quad (2')$$

and equation (2') may be rewritten as follows by using the logarithm as in the case gf equation (2).

$$L_3'(w) = \max_s [\log\{P(X,S|\lambda^w)\}] \quad (3')$$

The typical HMM used in voice recognition hitherto is as shown in FIG. 2. In the diagram, $q_i$ denotes an i-th state, $a_{ij}$ is the transition probability of changing from state $q_i$ to state $q_j$, and $b_i(x)$ is the probability or probability density observed in the state $q_i$ of the label or feature vector x. Hereinafter, x is a vector having a continuous value.

At this time, the state $q_i$ of HMM is considered to correspond to the partial segment i of the voice corresponding to its HMM. Therefore, the probability density $b_i(x)$ of observation of x in state $q_i$ is the probability density at which the x occurs in the segment i, and the transition probability $a_{ii}$ is understood as the probability of $x_{t+1}$ to be contained in segment i again at time $t+1$ when $x_t$ at time t is contained in segment i. From such point of view, the following two points may be indicated as the problems in the conventional HMM.

(1) Since the parameter for defining the function $b_i(x)$ is constant with respect to the state $q_i$, each segment may be regarded to be constant in the probability distribution in its interval. Therefore, depending on the phoneme, although the feature of the time-wise change (dynamic feature) of the feature vector is important, the feature cannot be expressed adequately in the conventional model.

(2) The length $\tau$ of the segment is considered to conform to a certain probability distribution, but in the conventional model, since the transition probabilities $a_{ii}$, $a_{ij}$ are constant regardless of the length of the sequence of state $q_i$, the length of the segment i follows the exponential distribution substantially and the distribution profile does not always express the reality correctly.

Concerning these two problems, as for point (2), it is already known to use the Poisson's distribution or $\Gamma$-distribution as to the probability density function $d_i(\tau)$ relating to the length l of the sequence of the state qi.

SUMMARY OF THE INVENTION

It is hence a primary object of this invention to solve the problem of (1) by composing the HMM allowing the parameter for characterizing the probability density function $b_i(x)$ for giving the occurrence probability of the feature vector in the state $q_i$ to vary linearly in time within the same segment (state).

More specifically, this invention presents an apparatus for fabricating an HMM composed in the limiting conditions in which the parameters for characterizing the probability density function $b_i(x)$ for deriving the occurrence probability density of the feature vector in state $q_i$, for example, the mean, varies linearly in time in the same segment (state), and also presents a likelihood calculating apparatus for efficiently calculating the conformity of an arbitrary vector sequence and this HMM.

While the novel features of the invention are set forth in the appended claims, the invention both as to organization and content, will be better understood and appreciated, along with other objects and features thereof, from the following detailed description taken in conjunction with the drawings.

DESCRIPTION OF THE PREFERRED EMBODIMENT

Figure 1:
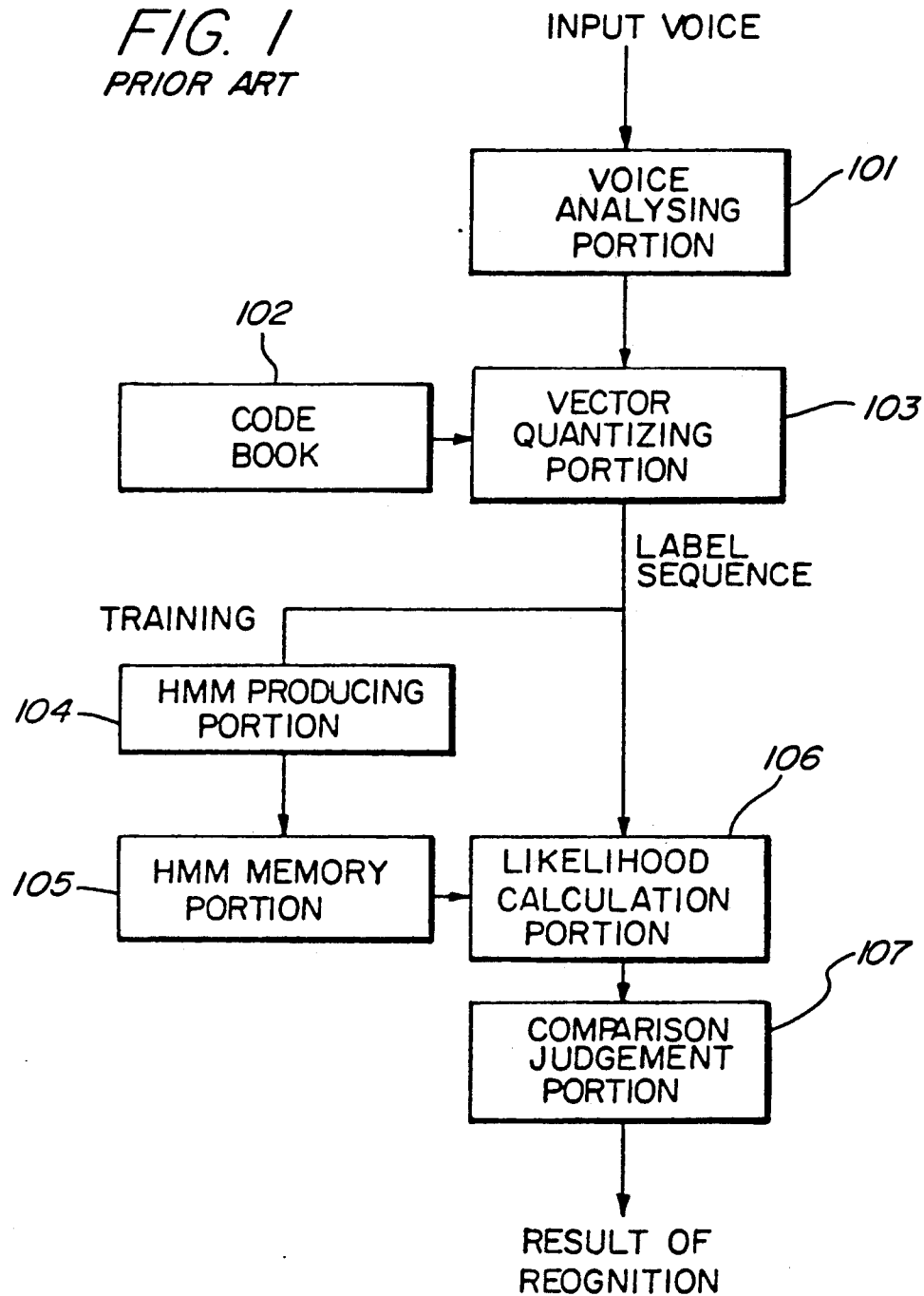
FIG. 1 is a block diagram of a conventional voice recognition apparatus using HMM.
Figure 2:
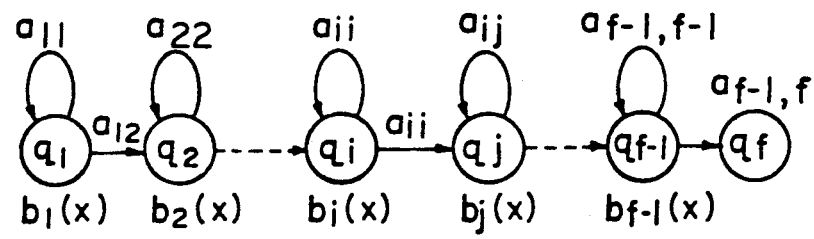
FIG. 2 is a conceptual drawing showing the concept of a typical conventional HMM; 15

Referring now to the drawings, this invention is described below. In the explanation to follow, the states $q_i$, $q_j$, and so forth are expressed merely as i, j, and so forth for the sake of simplicity as far as no misunderstanding is anticipated.

Figure 3:
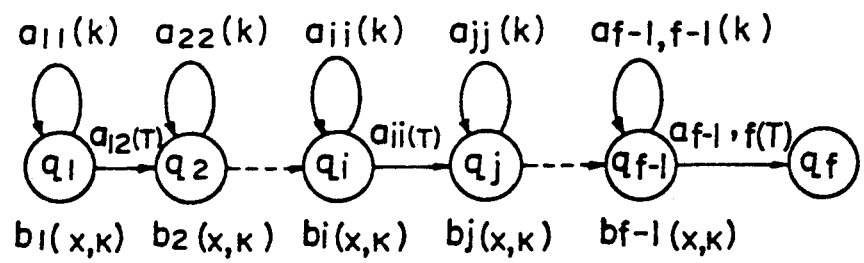
FIG. 3 is a conceptual drawing showing the concept of an HMM according to this invention.

FIG. 3 shows a proposed conceptual scheme of HMM wherein $a_{ij}(\tau)$ is a transition probability defining the probability of transition of state i which is repeated for $\tau$ times to a state of j, and $b_i(l, k, x)$ is a probability density of generating a feature vector x which is defined to the k-th state k ($\leq \tau$) of state i which is repeated for $\tau$ times.

In FIG. 3 if $a_{ij}(\tau)$ is substituted by;

$$a_{ij}(\tau) = \{1 - a_{ii}(\tau)\}a_{ij}, \sum_{j(\neq i)} a_{ij} = 1, \text{then}$$

Figure 4:
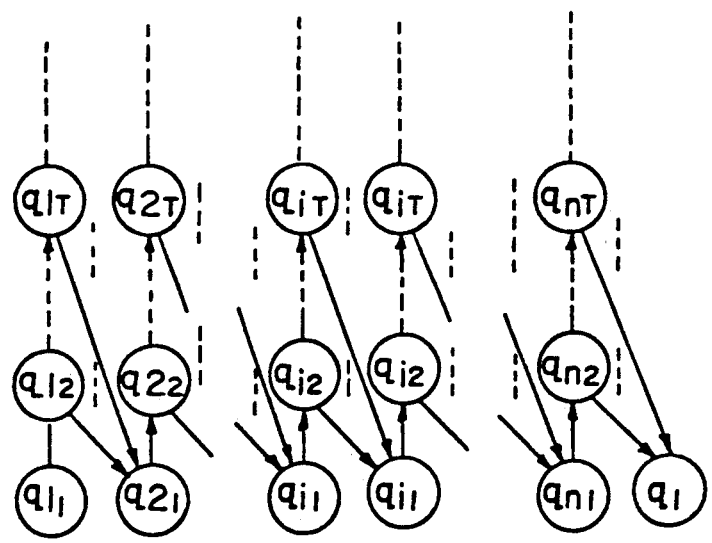
FIG. 4 is a conceptual drawing of an HMM expressing FIG. 3 in a simple Markov model equivalent thereto.

FIG. 4 can be derived. The meaning of this formula is that $1 - a_{ii}(\tau)$ is a transition probability of state i to change into a state other than the state i, and $a_{ij}$ can be understood as a probability of state i to change it into a state j ($\neq i$) among these.

In this case, when $\tau_1 \neq \tau_2$, $b_i(\tau_1, k, x) \neq b_i(\tau_2, k, x)$ is established. Whereas the k-th state when the state i is repeated for $\tau_1$ times is different from the k-th state when the state i is repeated for $\tau_2$ times, unless otherwise specified, the following equations are established if the continuation length of state i is $\tau$ and the k-th state of its continuation is simply expressed by $q_{ik}$.

$$a_{i\,kik+1} = a_{ii}(\tau), b_{ik}(x) = b_i(\tau, k, x)$$

Figure 5:
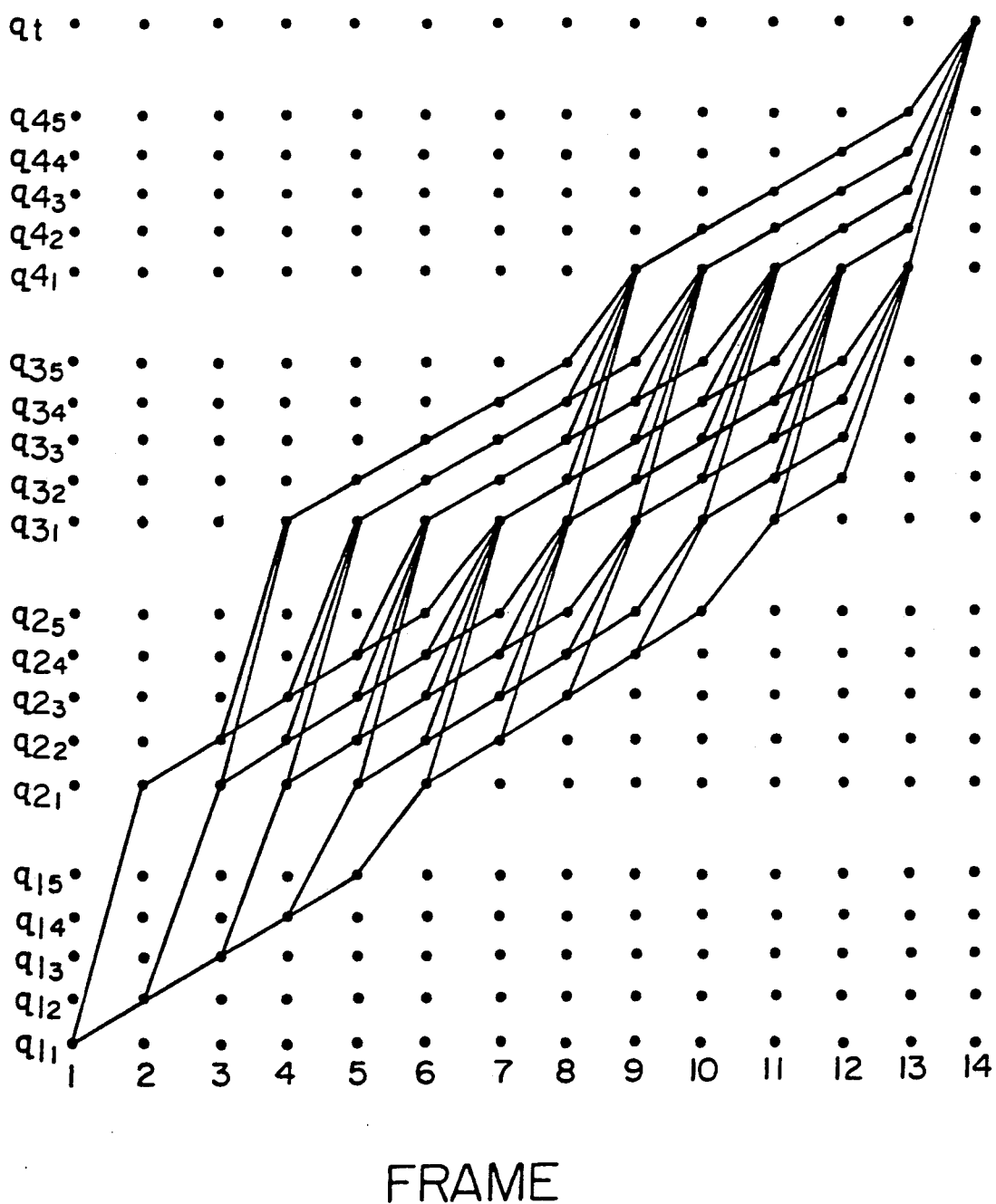
FIG. 5 is a trellis diagram corresponding to the HMM in FIG. 4.

FIG. 5 is a trellis diagram of the HMM corresponding to FIG. 4. That is, a horizontal line denotes TIME and a vertical line denotes STATE and FIG. 5 is one of examples of lattice graphs showing possible state sequences. However, for simplifying the expression, $q_{ik}$ represents the k-th state of state i when it lasts for $\tau$. In the present case, it should be noted that the state is made common as the k-th condition for the cases where $\tau = 1$, 2, 3. Each state sequence is shown by a vented line which is formed by connecting points showing states of each time. Hereinafter, this vented line is called a path.

Now, for the sake of convenience of the discussions to follow, the symbols to be used below are now defined. Also, states $q_i$, $q_j$ etc. are simply indicated as i, j, for the sake of convenience of the discussion, to the extent that there does not occur misunderstandings, and, as to the word "state", words "main state" or "sub state" is used.

$$i = \{i_1, i_2, \ldots\}: \text{i-th state } (k=1, \ldots, I),$$

$i_k$: sub state to be reached after continuation of k in main state $a_{i_k i_{k+1}}$: transition probability from state $i_k$ to $i_{k+1}(=\gamma_i)$, $A = [a_{ij}]$: transition matrix, $a_{ij}$: transition probability from main state i to main state j, $b_{ik}(x_t)$ probability density in which feature vector $x_t$ is generated in substate $i_k$.

$x_t$: feature vector observed at time point t, $X = x, x, \ldots x_T$: feature vector sequence observed at time-point $1, \ldots, T, S = s_1, s_2, \ldots$, $s_T$: state sequence corresponding to time points $1, \ldots, T$ $$\lambda_i = (\{a_{ij}\}^I_{j=1}, \mu_i, u_i, \Sigma_i, \gamma_i)$$

$\gamma$: parameter set in main state i $\lambda = \{\lambda_i\}^I_{i=1}$: set of all parameters (model having $\lambda$ as a parameter is called "model $\lambda$")

$\mu_i$: mean vector of feature vector observed in main state i, $u_i$: direction vector of the above line to give the mean vector of $b_{ik}(x)$, $\Sigma_i$: variance co-variance matrix of feature vector observed in main state i, Prob $(X|\lambda)$: probability density of occurrence of feature vector sequence X from model $\lambda$ or likelihood of model X for feature vector sequence X.

$s_t$: state at time point t, $q\Gamma$: final state $(=s_{T+1})$. $\pi_i = a_{s_0 s_0}$: probability that main state i occurs at $t=1$.

Next is explained the method of estimating the parameter of the model of this invention from the sample vector sequence actually observed.

The occurrence probability density $P(X|\lambda)$ of the output vector sequence X with respect to a certain HMM$\lambda$ is given as follows:

$$P(X|\lambda) = \sum_S P(X,S|\lambda) \quad (45)$$

where a new function $Q(\lambda, \lambda')$ is defined.

$$Q(\lambda, \lambda') = \sum_S P(X,S|\lambda) \log P(X,S|\lambda') \quad (6)$$

At this time, the following theorem is established.

[Theorem 1] If $Q(\lambda, \lambda') \geq Q(\lambda, \lambda)$, $P(X|\lambda') \geq P(X|\lambda)$. Here, the equal sign is established only when $\lambda = \lambda'$.

[Theorem 2] In case of $$\log P(X,S|\lambda) = \sum_{i=1}^{I} \log P_i(X,S|\lambda_i)$$

and $$Q_i(\lambda, \lambda_i') = \sum_S P(X,S|\lambda) \log P_i(X,S|\lambda_i').$$

if $\lambda_i$ belongs to         and log $P_{i(X,S|\lambda_i)}$ is      in the upward direction with regard to $\lambda_i$, when $Q_i(\lambda, \lambda_i)$ is fixed to $\lambda$, and treated as a function of $\lambda_i$, a single global maximum is produced with       in the upward direction. If a point at which the maximum value is given is $\lambda_i$, $P(X|\lambda)$ $P(X|\lambda)$ as to $\lambda = (\lambda_i)$ and the equal size is established when $\lambda = \lambda$.

By use of this theorem, estimation of parameter can be carried out. That is, if $\lambda_i$ belongs to      set, and log $P_i(X,S|\lambda_i)$ is       in the upward direction with regard to $\lambda_i$, $\lambda$ is focused to value which is needed, by giving an appropriate initial value to $\lambda_i$ and calculating $\lambda_i' = \lambda_i$ which satisfy $\partial Q_i(\lambda, \lambda_i')/\partial \lambda_i' = \partial Q(\lambda, 80')/\partial \lambda_i' = 0$.

According to this principle, the principle of the model making method of this invention is explained below.

Equation (6) may be rewritten as $$P(X,S|\lambda) = \prod_{t=1}^{T+1} a_{s_{t-1} s_t} \prod_{t=1}^{T} b_{s_t}(x_t)$$

And hence, $$\prod_{t=1}^{T+1} a_{s_{t-1} s_t} = \prod_{t=1}^{t_i(S)} a_{s_{t-1} s_t} \left( \prod_{k=1}^{\tau_i(S)} a_{i_k-1 i_k} \right) (1 - a_{i\tau_i(S) i\tau_i(S)+1}) \times$$

$$a_{s_{t_i(S)+\tau_i(S)-1 s_{t_i(S)+\tau_i(S)}}} \prod_{t=t_i(S)+\tau_i(S)}^{T+1} a_{s_{t-1} s_t}$$

$$\prod_{t=1}^{T} b_{s_t}(x_t) = \prod_{t=1}^{t_i(S)-1} b_{s_t}(x_t) \prod_{k=1}^{\tau_i(S)} b_{ik}(x_{t_i(S)-1+k}) \times$$

$$\prod_{t=t_i(S)+\tau_i(S)}^{T} b_{s_t}(x_t)$$

And finally we obtain $$Q(\lambda, \lambda') = \sum_S P(X,S|\lambda) \log P(X,S|\lambda') \quad (7)$$

$$= \sum_S P(X,S|\lambda) \times$$

$$\left\{ \sum_{t=1}^{t_i(S)} \log a_{s_{t-1} s_t}' + \sum_{k=1}^{\tau_i(S)} \log a_{i_k-1 i_k}' + \right.$$

$$\log(1 - a_{i\tau_i(S) i\tau_i(S)+1}') + \log a_{s_{t_i(S)+\tau_i(S)-1 s_{t_i(S)+\tau_i(S)}}}' +$$

$$\sum_{t=t_i(S)+\tau_i(S)}^{T+1} \log a_{s_{t-1} s_t}' + \sum_{t=1}^{t_i(S)-1} \log b_{s_t}(x_t)' +$$

$$\left. \sum_{k=1}^{\tau_i(S)} \log b_{ik}(x_{t_i(S)-1+k})' + \sum_{t=t_i(S)+\tau_i(S)}^{T} b_{s_t}(x_t)' \right\}$$

Equation (7) is described in details below while referring to the drawings.

Figure 6:
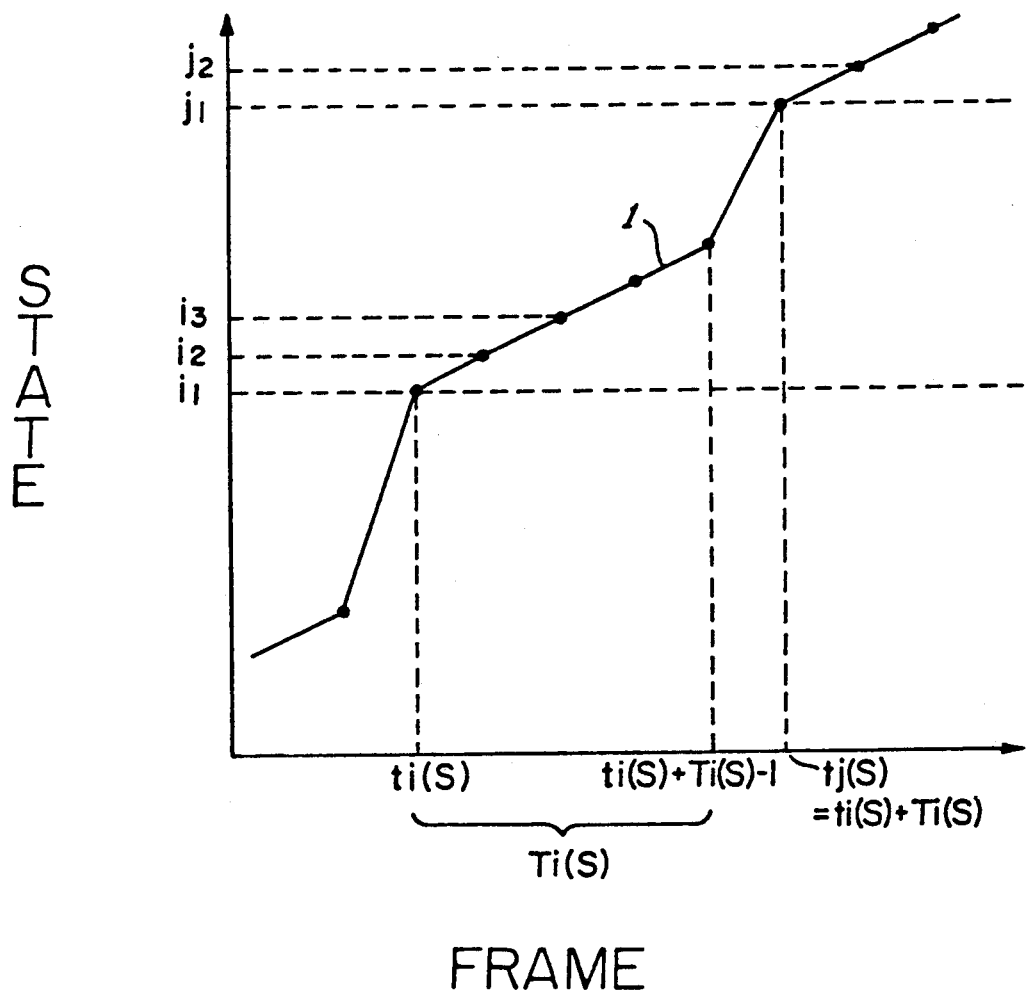
FIG. 6 is a drawing to explain the principle of this invention.

FIG. 6 is a lattice graph showing an example of state sequence S, plotting the time on the abscissa and the state on the ordinate. In this diagram, the state sequence S is expressed by a polygonal line 1 linking the points representing the state at each time by a line segment (hereinafter this polygonal line is called a path).

Meanwhile, $t_i(S)$ is the start time (frame number) of the sequence of the state i on the path S, and $\tau_i(S)$ is the length (number of frames) of the sequence of said i. That is, in path S, the state i begins with $t_i(S)$ frame, and ends with the $t_i(S) + \tau_i(S) - 1$ frame.

The first to fifth terms in the braces at the right side of equation (7) are related with the state transition probability, and the sixth to eighth terms are related with the probability of occurrence of observation vector.

First of all, the meanings of the terms related to the state transition probability are as follows.

The first term is the occurrence probability of the state sequences $S_1, \ldots, S_t(s)$ along the path S;

The second term is the probability of occurrence of the state sequences $S_{ti}(s), \ldots, S_{p_{ti}}(s) + \tau_i(s) - 1$ along the path S;

The third term is the probability of slipping out of the state i after the state i continues $\tau_i(s)$ times;

The fourth term is the probability of changing from state $s_{ti}(s) + \tau_i(s) - 1$ to state $s_{ti}(s) + \tau$, that is, the probability $a_{ij}$ of changing from state i to state j by assumption; and The fifth term is the logarithm of the occurrence probability density of state sequences $s_{ti}(s) + \tau_i(s), \ldots, S_{T+1}$ along the path S.

The terms relating to the occurrence probability density of the observation vector are as follows. The sixth and eighth terms are probability densities of occurrence of observation vector sequences $x_1, \ldots x_{ti}(s) - 1$; $x_{ti}(s) + \tau_i(s), \ldots, x_T$ in the state sequence $s_1, \ldots, s_i(s) - 1$; $s_i(s) + \tau_i(s), \ldots, s_T$ along the path S; and The seventh term is the logarithm of the probability density of occurrence of observation vector sequences $x_i(s), \ldots, x_{ti}(s) + \tau_i(s) - 1$ in the state sequences $s_{ti}(s) = i_1, \ldots, s_{ti}(s) + \tau_i(s) - 1 = i_\tau$ along the path S.

Considering in such divided portions, it may be easily understood that the following equation is established.

$$\frac{\partial Q(\lambda,\lambda')}{\partial \lambda_i'} = \frac{\partial}{\partial \lambda_i'} \sum_S P(X,S|\lambda) \times \qquad (8)$$

$$\left\{ \sum_{k=1}^{\tau_i(S)} \log a_{i_k-1 i_k}' + \log(1 - a_{i_{\tau_i(S)} i_{\tau_i(S)}+1}') + \right.$$

$$\left. \log a_{s_{ti}(S) + \tau_i(S) - 1 s_{ti}(S) + \tau_i(S)}' + \sum_{k=1}^{\tau_i(S)} \log b_{i_k}(x_{ti}(S) - 1 + k)' \right\} =$$

$$\sum_t \sum_\tau \sum_{j(\neq i)} P(X, s_{t-\tau} = i_1, s_t = j_1 | \lambda) \times$$

$$\frac{\partial}{\partial \lambda_i'} \left( \sum_{k=1}^{T} \log a_{i_k-1 i_k}' + \log(1 - a_{i_\tau i_\tau+1}') + \right.$$

$$\left. \log a_{ij}' + \sum_{k=1}^{T} \log b_{ik}(x_{t-\tau-1+k})' \right) =$$

$$\sum_t \sum_\tau \sum_{j(\neq i)} P(X, s_{t-\tau} = i_1, s_t = j_1 | \lambda) \times$$

$$\frac{\partial}{\partial \lambda_i'} \left\{ \log d_i(\tau)' + \log a_{ij}' + \sum_{k=1}^{T} \log b_{ik}(x_{t-\tau-1+k})' \right\}$$

Here, in equation (8), sum of the first and second terms in the right-hand side { } of the second equation part is logarithm of probability with length of state 1 series being $\tau$. Therefore, the probability is defined as $d_i(\tau)$, the last equation part of equation (8) is obtained.

Figure 7:
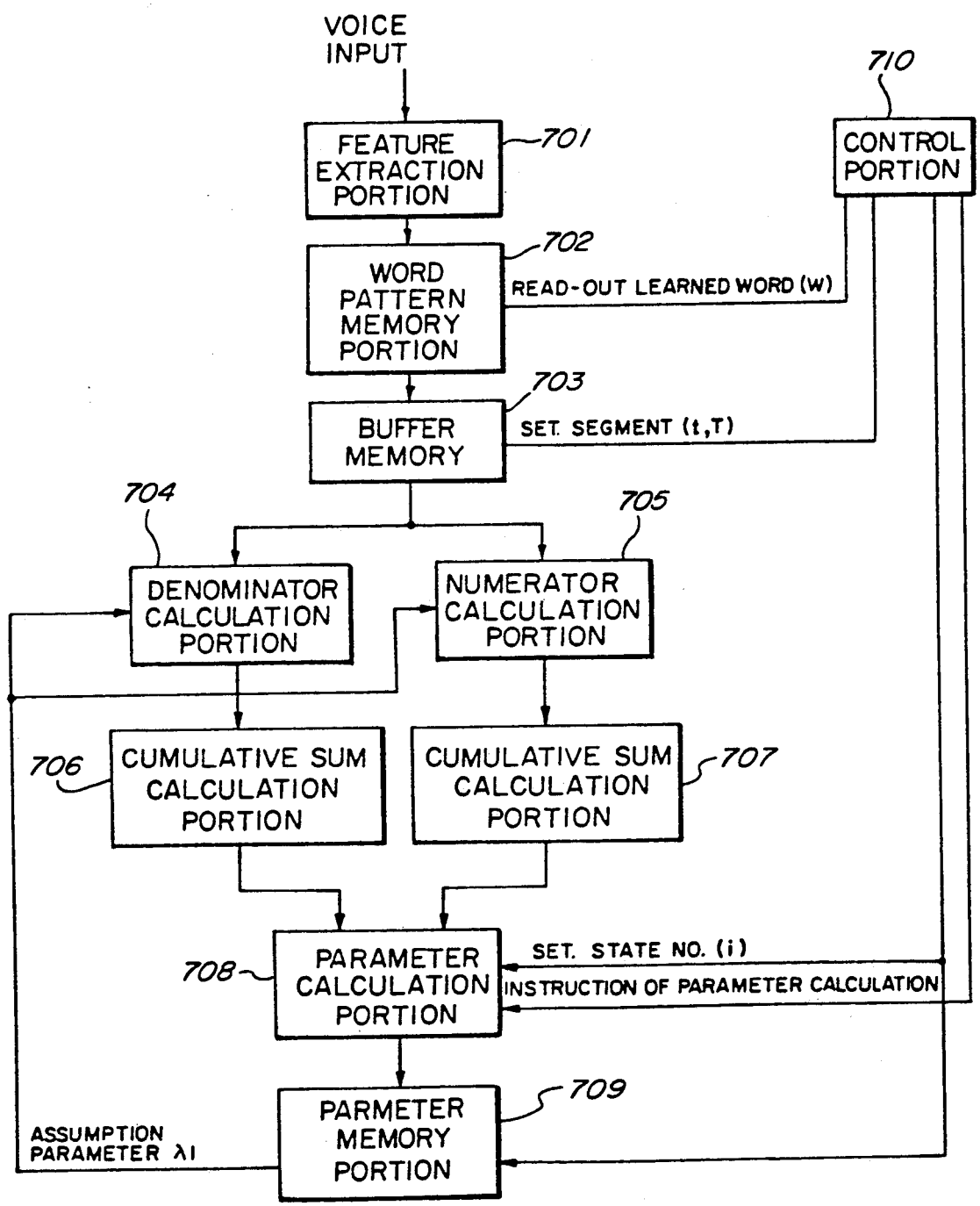
FIG. 7 is a block diagram showing an embodiment of the HMM fabricating apparatus of the invention.

In equation (8), $P(X, s_{t-\tau} = i_1, s_t = j_1 | \tau)$ is the simultaneous probability density of X in model $\tau$, $s_{t-\tau} = i_1$ and $s_t = j_1$, and when shown in a drawing, it is the total sum of probability density of paths which pass through the slanted line portions in FIG. 7. By use of this, calculation of the total sum regarding path S in equation (8) is carried out as follows. That is, first, the total sum of probability density of paths passing through said slanted line portion as to all combinations of t, $\tau$, j, (i.e., $P(X, s_{t-\tau} = i_1, s_t = j|\tau)$) is calculated. Then, the total sum of the thus obtained calculation results is carried out in a whole range.

Change from the first equation to the second equation in equations (6), (7) is based upon this thought.

$P(X, s_{t-\tau} = i_1, s_t = j_1 | \tau)$ is calculated as follows. That is, supposing that:

$$\alpha_t(i) = P(x_1, x_2, \ldots, x_{t-1}, s_t = i_1 | \lambda)$$
$$\beta_t(i) = P(x_t, x_{t+1}, \ldots, x_T | s_t = i_1, \lambda)$$

$$P(X, s_{t-\tau} = i_1, s_t = j_1 | \lambda) = \alpha_{t-\tau}(i) d_i(\tau) a_{ij} \prod_{k=1}^{T} b_i(x_{t-\tau-1+k}) \beta_t(j) \qquad (9)$$

Also, $$\alpha_t(j) = \sum_i \sum_\tau \alpha_{t-\tau}(i) d_i(\tau) a_{ij} \prod_{k=1}^{T} b_i(x_{t-\tau-1+k}) \qquad (10)$$

and $$\beta_t(i) = \sum_j \sum_\tau d_i(\tau) a_{ij} \prod_{k=1}^{T} b_i(x_{t-\tau-1+k}) \beta_{t+\tau}(j) \qquad (11)$$

Accordingly, equation (9) can be calculated by giving an appropriate initial value to parameter $\lambda$ with $\alpha_1(1) = 1$ and calculating $\alpha_t(j)$ along equation (10) as to $t = 1 \sim T+1$, $j = 1 \sim I$ I and by calculating equation (11) as to $t = T+1 \sim 1$, $i = 1 \sim 1$ with $B_{T+1}(f) = 1$. Then, by use of equation (8), $\lambda_i$ can be estimated. Hence, each parameter may be estimated as follows.

Estimation of $a_{ij}$

According to Lagrange's method, that is, using equation (8)

$$0 = \frac{\partial}{\partial a_{ij}'} \left\{ Q(\lambda, \lambda') - \theta \left( \sum_{\substack{k=1 \\ k \neq i}}^{i} a_{ik}' - 1 \right) \right\}$$

$$= \frac{\partial}{\partial a_{ij}'} \left\{ \sum_t \sum_\tau P(X, s_{t-\tau} = i_1, s_t = j_1 | \lambda) \log a_{ij}' - \right.$$

$$\left. \theta \left( \sum_{\substack{k=1 \\ k \neq i}}^{i} a_{ik}' - 1 \right) \right\}$$

$$= \frac{1}{a_{ij}'} \sum_t \sum_\tau P(X, s_{t-\tau} = i_1, s_t = j_1 | \lambda) - \theta$$

therefore, $$\sum_t \sum_\tau P(X, s_{t-\tau} = i_1, s_t = j_1 | \lambda) = a_{ij}' \theta \qquad (12)$$

and now considering $$\sum_{k=1}^{i} a_{ik}' = 1,$$
$$k \neq i$$

, summing up for j on both sides of equation (12) yields $$\theta = \sum_{t} \sum_{\tau} \sum_{j(\neq i)} P(X, s_{t-\tau} = i_1, s_t = j_1 | \lambda)$$

Putting it into equation (12), we obtain $$a_{ij} = \frac{\sum_{t} \sum_{\tau} P(X, s_{t-\tau} = i_1, s_t = j_1 | \lambda)}{\sum_{t} \sum_{\tau} \sum_{j(\neq i)} P(X, s_{t-\tau} = i_1, s_t = j_1 | \lambda)} \quad (13)$$

This indicates ratio of simultaneous probability density of states; and j to probability of state i, and corresponds to the definition of $a_{ij}$.

Estimation of transition probability $a_{ik-1ik}$

In the HMM as shown in FIG. 3, other parameters vary depending on k, but the transition probability $a_{ik-1ik}$ in state i is constant regardless of k as in the traditional model; in which case, the transition probability $\gamma_i$ is determined as follows.

In this case, the following equation is obtained by putting $d_i(\tau)' = \gamma_i'^{\tau-1}(1-\gamma_i')$, $\tau_i' = \gamma_i'$ into equation (8).

$$0 = \frac{\partial Q(\lambda, \lambda')}{\partial \gamma_i'}$$

$$= \sum_{t} \sum_{\tau} \sum_{j(\neq i)} P(X, s_{t-\tau} = i_1, s_t = j_1 | \lambda) \frac{\partial}{\partial \gamma_i'} \log d_i(\tau)$$

$$= \sum_{t} \sum_{\tau} \sum_{j(\neq i)} P(X, s_{t-\tau} = i_1, s_t = j_1 | \lambda) \times$$
$$\frac{\partial}{\partial \gamma_i'} \{(\tau - 1) \log \gamma_i' + \log (1 - \gamma_i')\}$$

$$= \sum_{t} \sum_{\tau} \sum_{j(\neq i)} P(X, s_{t-\tau} = i_1,$$
$$s_t = j_1 | \lambda) \left[ (\tau - 1) \frac{1}{\gamma_i'} - \frac{1}{1 - \gamma_i'} \right]$$

hence we obtain $$\gamma_i = \frac{\sum_{t} \sum_{\tau} \sum_{j(\neq i)} P(X, s_{t-\tau} = i_1, s_t = j_1 | \lambda)(\tau - 1)}{\sum_{t} \sum_{\tau} \sum_{j(\neq i)} P(X, s_{t-\tau} = i_1, s_t = j_1 | \lambda)\tau} \quad (14)$$

The equation (14) can be interpreted as follows by intuition.

An initial value $\tau_{ex}$ of length of "inherent" series of state i based upon transition probability Yi between substates at state i is:

$$\tau_{ex} = \sum_{\tau=1}^{\infty} \tau \gamma_i'^{\tau-1}(1-\gamma_i') = \frac{1}{1-\gamma_i'}$$

From this equation, $$\gamma_{i'} = \frac{\tau_{ex} - 1}{\tau_{ex}} \quad (15)$$

Therefore, equation (14) is a transition probability calculated at state i only, i.e., the ratio of expected value regarding paths of a denominator and a numerator of equation (15).

Estimation of orobability density function $b_{ik}(x)$ of feature vector x

Conventionally, as mentioned above, the parameter for defining the probability distribution of the feature vector x in state i is to assume the stationary property that it is constant within the state i regardless of the time, and it is considered irrational to express the transient portion of the voice.

Accordingly, to improve this point, it is attempted to express the parameter for defining the probability distribution in a simple time function.

Supposing the distribution of thefeature vector to be normal distribution, within state i, it is regarded that the mean $\xi_i$ varies linearly with respet to the time, while the covariance matrix $\Sigma_i$ is constant time-wise in state i.

At this time, the probability density with respect to the feature vector $x_{t-\tau-1+k}$ is $b_{ik}(x_{t-\tau-1+k}) = N(x_{t-\tau-1+k}, \xi_i(\tau,k), \Sigma_i) =$ $$(2\pi)^{\frac{d}{2}} (\Sigma_i^{-1})^{\frac{d}{2}} \exp\left[-\frac{1}{2} g(x_{t-\tau-1+k})^T \Sigma_i^{-1} g(x_{t-\tau-1+k})\right]$$

where $g(x_{t-\tau-1+k}) = x_{t-\tau-1+k} - \xi_i(\tau,k)$ $\xi_i(\tau,k) = \mu_i + \left[k - \frac{\tau+1}{2}\right] u_i$ where $\tau$ denotes the number of frames in the voice segment i corresponding to the state i, $t-1$ is the final frame, k is the frame number sequentially counting from the starting frame of segment i as 1, $\mu_i$ is the neutral point vector in the segment i of straight line $\xi_i(t,k)$, and $u_i$ is the direction vector of $\xi_i(k)$ Then, $\mu_i$, $u_i$, $\Sigma_i$ are estimated as follows.

(Estimation of $\mu_i$)
From equation (7), it yields $$0 = \frac{\partial Q(\lambda, \lambda')}{\partial \mu_i'}$$

$$= \sum_{t} \sum_{\tau} \sum_{j(\neq i)} P(X, s_{t-\tau} = i_1, s_t = j_1 | \lambda) \times$$
$$\frac{\partial}{\partial \mu_i'} \left\{ \sum_{k=1}^{\tau} \log b_{ik}(x_{t-\tau-1+k})' \right\}$$

$$= \sum_{t} \sum_{\tau} \sum_{j(\neq i)} P(X, s_{t-\tau} = i_1,$$
$$s_t = j_1 | \lambda) \sum_{k=1}^{\tau} (\mu_i' - x_{t-\tau-1+k})^T \Sigma'^{-1}$$

hence, we obtain $$\mu_i = \frac{\sum_{t} \sum_{\tau} \sum_{j(\neq i)} P(X, s_{t-\tau} = i_1, s_t = j_1 | \lambda) \sum_{k=1}^{\tau} x_{t-\tau-1+k}}{\sum_{t} \sum_{\tau} \sum_{j(\neq i)} P(X, s_{t-\tau} = i_1, s_t = j_1 | \lambda)\tau}$$

The numerator of equation (16) is an expected value regarding the path of the total sum in the feature vector sequence in period i and the deonminator thereof is an expected value regarding the pathfo length of period i series. This is understandable even by intuition.

(Estimation of $u_i$)
From equation (8), it is known that

-continued $$0 = \frac{\partial \theta(\lambda,\lambda')}{\partial u_i'}$$

$$= \sum_t \sum_\tau \sum_{j(\neq i)} P(X, s_{t-\tau} = i_1, s_t = j_1 | \lambda) \times$$

$$\frac{\partial}{\partial u_i'} \left( \sum_{k=1}^{\tau} \log b_{ik}(x_{t-\tau-1+k})' \right)$$

$$= \sum_t \sum_\tau \sum_{j(\neq i)} P(X, s_{t-\tau} = i_1, s_t = j_1 | \lambda) \times$$

$$\left[ \sum_{k=1}^{\tau} \left[ k - \frac{\tau+1}{2} \right] x_{t-\tau-1+k} - \frac{(\tau-1)\tau(\tau+1)}{12} \right] \Sigma_i^{-1}$$

hence, we obtain $$u_i = \frac{\sum_t \sum_\tau \sum_{j(\neq i)} P(X, s_{t-\tau} = i_1, s_t = j_1 | \lambda) \sum_{k=1}^{\tau} \left[ k - \frac{\tau+1}{2} \right] x_{t-\tau-1+k}}{\sum_t \sum_\tau \sum_{j(\neq i)} P(X, s_{t-\tau} = i_1, s_t = j_1 | \lambda) \frac{(\tau-1)\tau(\tau+1)}{12}} \quad (17)$$

Equation (17) can be interpreted as follows.

Supposing that feature vector sequence contained in period i is $x_{t-\tau}, \ldots, x_{t-1}$ and minimum square line is $$\xi_i \cdot (\tau, k) = \mu_{i'} + \left[ k - \frac{\tau+1}{2} \right] u_{i'}$$

$u_{i'}$ is obtained as a solutioon of $$\frac{\partial}{\partial u_{i'}} \sum_{k=1}^{\tau} \{x_{t-\tau-1+k} - \xi_i \cdot (\tau, 1k)\}^2 = 0$$

and therefore;

$$u_{i'} = \frac{\sum_{k=1}^{\tau} \left[ k - \frac{\tau+1}{2} \right] x_{t-\tau-1+k}}{\frac{(\tau-1)\tau(\tau+1)}{12}}$$

therefore, $u_i$ is an expected value regarding paths of a denominator and a numerator of $u_{i'}$.

(Estimation of $\Sigma_i$)

At m, n=1 to d, it is supposed that $\Sigma_i = [\sigma_{imn}]$ $\Sigma_i^{-1} = [\sigma_i^{mn}]$, and remainder factors of $\sigma_{imn}$, $\sigma_i^{mn}$ are respectively supposed as $S_{imn}$, $S_i^{mn}$. At this time, it is known that $$\sigma_{imn} = \frac{1}{|\Sigma_i^{-1}|} S_i^{mn}$$

and also that $$|\Sigma_i^{-1}| = \sum_{n=1}^{d} \sigma_i^{mn} S_i^{mn}$$

Hence, $$\frac{\partial}{\partial \sigma_i^{mn}} \log |\Sigma_i^{-1}| = \frac{1}{|\Sigma_i^{-1}|} \frac{\partial |\Sigma_i^{-1}|}{\partial \sigma_i^{mn}}$$

$$= \frac{1}{|\Sigma_i^{-1}|} S_i^{mn} = \sigma_{imn}$$

Therefore, from equation (8), we obtain $$0 = \frac{\partial Q(\lambda,\lambda')}{\partial \sigma_i^{mn'}} \quad (18)$$

$$= \sum_t \sum_\tau \sum_{j(\neq i)} P(X, s_{t-\tau} = i_1, s_t = j_1 | \lambda) \times$$

$$\frac{\partial}{\partial \sigma_i^{mn'}} \left( \sum_{k=1}^{\tau} \log b_{ik}(x_{t-\tau-1+k})' \right)$$

$$= \frac{1}{2} \sum_t \sum_\tau \sum_{j(\neq i)} P(X, s_{t-\tau} = i_1, s_t = j_1 | \lambda) \times$$

$$\sum_{k=1}^{\tau} [\sigma_{imn}' - \{x_{t-\tau-1+k \cdot m} - \xi_{i \cdot m}(\tau,k)\}\{x_{t-\tau-1+k \cdot n} - \xi_{i \cdot n}(\tau,k)\}]$$

That is, $$\sigma_{imn} = \frac{\sum_t \sum_\tau \sum_{j(\neq i)} P(X, s_{t-\tau} = i_1, s_t = j_1 | \lambda) \times \sum_{k=1}^{\tau} \{x_{t-\tau-1+k \cdot m} - \xi_{i \cdot m}(\tau,k)\}\{x_{t-\tau-1+k \cdot n} - \xi_{i \cdot n}(\tau,k)\}}{\sum_t \sum_\tau \sum_{j(\neq i)} P(X, s_{t-\tau} = i_1, s_t = j_1 | \lambda) \tau}$$

Here, $x_{t-\tau-1+k,m}$, $\xi_{i,m}(\tau,k)$ etc. mean mth components of vectors $x_{t-\tau-1+k}$, $\xi_i(k)$. Expressing in matrix yields $$\Sigma_i^{-1} = \frac{\sum_t \sum_\tau \sum_{j(\neq i)} P(X, s_{t-\tau} = i_1, s_t = j_1 | \lambda) \times \sum_{k=1}^{\tau} \{x_{t-\tau-1+k} - \xi_i(\tau,k)\}\{x_{t-\tau-1+k} - \xi_i(\tau,k)\}^T}{\sum_t \sum_\tau \sum_{j(\neq i)} P(X, s_{t-\tau} = i_1, s_t = j_1 | \lambda) \tau} \quad (18')$$

This equation also corresponds very well to the definition of variance and covariance by intuition.

The actual calculating procedure for estimation of parameters is as follows.

When making a model $\lambda^w$ corresponding to a word w, it is supposed that the pattern corresponding to the word w, i.e., $w_r = x^r_1, \ldots, s^r_{T_r}$ (r = 1 ~ R; $x^r_t$ is a feature vector of t-th in pattern r and $T_r$ is the number of frame of pattern r) is given as a training pattern.

(1) $L_1 = \infty$ (2) A proper initial value is given to all parameters of $\lambda_1 = \{a_{ij}, \gamma_i, \mu_i, u_i, \Sigma_i\}$ (i, j = 1 ~ I).

(3) For r = 1 ~ R, t = 2 ~ $T_r$, $\alpha$ = 1 ~ t−1 and i = 1 ~ I, $\alpha_t(r, i)$ is calculated as $\lambda = \{\lambda_1\}$ according to equation (10), where $\alpha_t(r, i)$ is the $\alpha_t(i)$ for the pattern $w_r$ and the $T_r$ is the total number of frames of that pattern.

(4) For r = 1 ~ R, t = 2 ~ $T_r$, $\tau$ = 1 ~ t−1 and i, j = 1 ~ I, $\beta_t(r, i)$ and $P(w_r, s_{\alpha-\tau} = i_1, s_t = j_1 | \lambda)$ are calculated as $\lambda = \{\lambda_1\}$ according to equations (11) and (12) respectively, where $\beta_t(r, i)$ are the $\beta_t(i)$ for the pattern $w_r$.

(5) For r = 1 ~ R, i, j = 1 ~ I, for pattern $w_r$, $a_{ij, num}(r)$, $\gamma_{i,num}(r)$, $\mu_{i,num}(r)$, $u_{i,num}(r)$ and $\Sigma_{i,num}(r)$, which are numerators of equations (13),(14),(16),(17),(18), and $a_{ij,denom}(r)$, $\gamma_{i,denom}(r)$, $\mu_{i,denom}(r)$, $u_{i,denom}(r)$ and $\Sigma_{i,denom}(r)$, which are the denominators, are calculated.

(6) $\bar{a}_{ij}$, $\bar{\gamma}_i$, $\bar{\mu}_i$, $\bar{u}_i$ and $\bar{\Sigma}_i$ which are the re-estimated values of $a_{ij}$, $\gamma_i$, $\mu_i$, $u_i$ and $\Sigma_i$ are calculated as follows.

$$\bar{a}_{ij} = \sum_{r=}^{R} \frac{1}{P(w_r|\lambda)} a_{ij,num}(r) / \sum_{=}^{R} \frac{1}{P(w_r|\lambda)} a_{ij,denom}(r)$$

$$\bar{\gamma}_i = \sum_{=}^{R} \frac{1}{P(w_r|\lambda)} \gamma_{i,num}(r) / \sum_{=}^{R} \frac{1}{P(w_r|\lambda)} \gamma_{i,denom}(r)$$

$$\bar{\mu}_i = \sum_{=}^{R} \frac{1}{P(w_r|\lambda)} \mu_{i,num}(r) / \sum_{=}^{R} \frac{1}{P(w_r|\lambda)} \mu_{i,denom}(r)$$

$$\bar{u}_i = \sum_{=}^{R} \frac{1}{P(w_r|\lambda)} u_{i,num}(r) / \sum_{=}^{R} \frac{1}{P(w_r|\lambda)} u_{i,denom}(r)$$

$$\bar{\Sigma}_i = \sum_{=}^{R} \frac{1}{P(w_r|\lambda)} \Sigma_{i,num}(r) / \sum_{=}^{R} \frac{1}{P(w_r|\lambda)} \Sigma_{i,denom}(r)$$

(7) For $i, j = 1 \sim I$, substitution of $a_{ij} = \bar{a}_{ij}$, $\gamma_i = \bar{\gamma}_i$, $\mu_i = \bar{\mu}_i$, $u_i = \bar{u}_i$, and $\Sigma_i = \bar{\Sigma}_i$ are executed to obtain renewal parameter set $\lambda = \{\lambda_i\}$.

(8) For $r = 1 \sim R$, $t = 2 \sim T_r$, and $i = 1 \sim I$, $\alpha_t(r, i)$ is calculated for the parameter set obtained by step (7) according to equation (10) and $$L_2 = \sum_{r=1}^{R} P(w_r|\lambda) = \sum_{r=1}^{R} \alpha_{T_r+1}(r, I) \text{ is calculated.}$$

(9) If $|L_1 - L_2|/L_1 > \epsilon$, then $L_2 = L_1$ and go to step (4); and if not, go to the end.

In step (9), $\epsilon$ denotes a properly small positive number to determine the width of convergence. When this value is small, the precision of estimation of parameter is improved, but the convergence time is longer, but when it is large, the convergence is fast but the precision is poor. Therefore a proper value should be determined depending on the application.

FIG. 7 shows an embodiment of the HMM fabricating apparatus according to this invention. In this embodiment, $a_{ij} = 1$ (for $j = i+1$), $a_{ij} = 0$ (for $j \neq i+1$) are explained by referring to the drawing. Numeral 701 is a feature extraction portion, in which the input voice signal is converted into a sequence of feature vectors by a well-known method such as filter bank and LPC analysis. Numeral 702 is a word pattern memory part, in which a plurality of training words for making model $\lambda$ are stored in a form of feature vector sequences. Numeral 703 is a buffer memory, in which the word patterns stored in the word pattern memory part 702 are taken out one by one and stored temporarily. Numerals 704 and 705 are to calculate the denominator and numerator of the equations (13), (14), (16), (17), (18') etc. for estimating the parameters in state i. Numeral 706 is a first cumulative sum calculating part for calculating the cumulative sum of the values calculated in the denominator calculating part 704. Numeral 707 is a second cumulative sum calculating part for calculating the cumulative sum of the values calculated in the numerator calculating part 705. Numeral 708 is a parameter calculating part, in which the estimated value of each parameter is determined by obtaining the ratio of the numerator and denominator of the parameters calculated in the first and second cumulative sum calculating parts 706, 707. Numeral 709 is a parameter memory part for storing the above estimated parameters. Numeral 710 is a control part, in which training word patterns stored in the word pattern memory part 702 are read out sequentially one by one, and a reading command of training word pattern for transferring to the buffer memory 702, and the candidate region for state i with respect to the word pattern stored in the buffer memory 703 are set, and the parameter calculation command and state number for calculating the parameters from the outputs of the cumulative sum calculating parts 706, 707 are set.

For example, the model $\lambda^w$ for word w is created in the following steps.

Uttering the word w for R times, R pieces of patterns converted into the feature vector sequence in the feature extraction portion 701 are stored in the word pattern memory part 702. From the word pattern memory part 702, the r-th ($r = 1$ to R) word pattern $w_r$ is read out by the reading command of learning word from the control part 710, and is stored in the buffer memory 703. In consequence, t, $\tau$ in calculation of equations (13), (14), (16), (17), (18'), etc. are supplied into the buffer memory 703 as the segment setting signals from the control part 710, and in the corresponding segment of the word pattern $w_r$ stored in the buffer memory 703, the denominator and numerator in the equations (13), (14), (16), (17), (18') are calculated by the denominator calculating part 704 and numerator calculating part 705. At this time, the parameters contained in the these denominators and numerators are provided with proper values $\lambda_i = \{\mu_i, u_i, \gamma_i, \Sigma_i\}$ as initial values in state 1. The cumulative sum calculating parts 706, 707 calculate the cumulative sum of the denominators and numerators with respect to the training word pattern $W_r$ ($r = 1$ to R). The parameter calculating part 708 obtains the ratio from the cumulative sums of the denominators and numerators in state i of the thus obtained training word patterns $w_r$ in $r = 1$ to R, and calculates a new estimated value of the parameter in state i. The parameter memory part 709 stores the estimated value $w_i$ of the parameter in state i corresponding to the word w obtained in this way.

Calculating as shown above with respect to $i = 1$ to I, and repeating similar calculations using $\lambda^w_i$ as a new $\lambda^w_i$, $\lambda^w_i$ converges to a specific value, which is the parameter to be determined.

Thus, in this invention, since it is designed so that the mean of the probability density for generating the feature vector in the state within the same state may vary linearly, if the same state continues, the defect in the conventional HMM in which the parameter for giving the occurrence probability density of the feature vector in the state is unchanged may be eliminated, and it is possible to make a more realistic model.

Below is described the apparatus for recognizing the actual input voice by using such model.

When determining a strict solution as shown in equation (1') relating to the prior art, equation (19) should be calculated, but the method being matched by the above model is explained below. This method is, of course, usable in determining the strict solution, but the method of obtaining an approximate solution corresponding to equation (2') is stated below.

Supposing $\phi(i, t)$ to be the maximum cumulative likelihood until time point t, state i, by using the above $c_t$, t(i), a recurrence formula with respect to equation (2') is established as follows:

$$\phi(i+1,t) = \max_{\tau}[\phi(i,t-\tau) c_{t,\tau}(i)] \quad (19)$$

Here, $$c_{t,\tau}(i) = d_i(\tau) \prod_{K=1}^{\tau} b_{ik}(x_{t-\tau-1+k})$$

Therefore, when $\phi(i, t)$ is sequentially determined with respect to $i=1$ to $I-1$, $t=1$ to $T+1$, $\phi(i, t)$ becomes the maximum likelihood of model $\lambda$ with respect to the input pattern X.

At this time, when the recurrence formula (19) is directly calculated, $C_{t,\tau}(i)$ is calculated for all possible combinations of $\tau=1$ to $t-1$, $i=1$ to I in every frame t ($=1$ to $T+1$), and the amount of computation is enormous. A second feature of the invention is that the object of reducing the amount of calculation is achieved by cleverly using the past calculated values. Here, for the convenience of the discussion below, the following quantity is defined.

$$A(i,\tau) = \prod_{k=1}^{\tau} a_{ik-1ik}(1-a_{i\tau i\tau+1}) \quad (20)$$

(where $a_{i\phi i1} = 1$).

$$B(i,t,\tau) = \prod_{k=1}^{\tau} b_{ik}(x_{t-\tau-1+k}) \quad (21)$$

At this time, the following facts are known. If $\tau = 1, 2$, the relations $$B(i,t,1) = bi_1(xt-1) \quad (22)$$

$$B(i,t,2) = bi_1(xt-2)bi_2(xt-1) \quad (23)$$

are established, and if $\tau \geq 3$, the relation $$B(i,t,\tau) = bi_1(xt-\tau)B(i,t.-1,\tau-2)bi_{\tau}(xt-1) \quad (24)$$

is established, and supposing $$h(i,\tau) = \prod_{k=1}^{\tau} a_{ik-1ik} \quad (25)$$

, it follows that $$h(i,\tau) = h(i,\tau-1)a i_{\tau-1} i_{\tau} \quad (26)$$

$$A(i,\tau) = h(i,\tau)(1-a i_{\tau} i_{\tau-1}) \quad (27)$$

Therefore, from the recurrence formulae in equations (22), (23), (24), $B(i, t, \tau)$ is obtained, and from the recurrence formula (26), putting $h(i, \tau)$ into equation (27), $A(i, \tau)$ is obtained, and from the obtained $A(i, \tau)$, $B(i, t, \tau)$, the recurrence formula (19) can be calculated.

Figure 8:
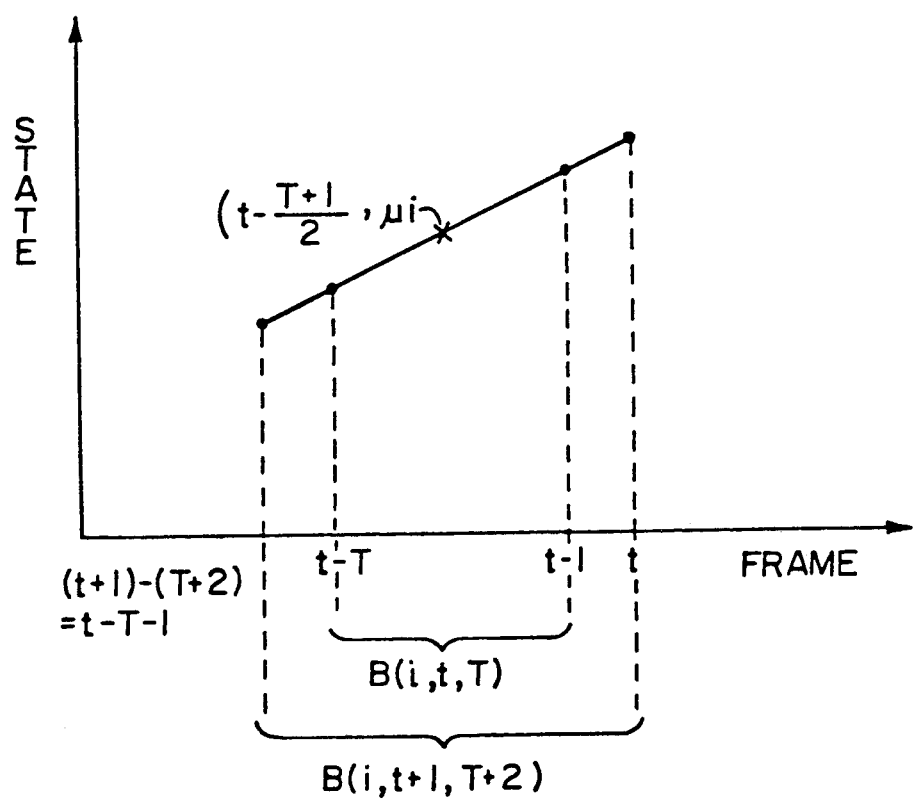
FIG. 8 is a drawing to explain the principle of the method for efficiently calculating the degree of matching of the input pattern with respect to the HMM of the invention.

Here, the equation (24) may be explained as follows (FIG. 8).

That is, the straight line L giving the mean vector of the probability density function of the feature vector in the i-th segment (state i) is given as the mean $\mu_i$, direction vector $u_i$, and when the B(i, t, $\tau$) causing the input feature vector sequence $\{xt-\tau-1+k\}^{\tau}_{k=1}$ to correspond to the segment is known, in order to obtain B(i, t+1, $\tau$+2) by causing $\{x(t+1)-(\tau+2)-1+k\}^{\tau+2}_{k=1}$ to correspond to said segment i, the straight line L' corresponding to the above straight line L is a line extending the line L by one frame to both sides, or 2 frames in total, and the relation of $$B(i,t+1,\tau+2) = bi_1(x(t+1)-(\tau+2)) \\ B(i,t,\tau)bi_{\tau+2}(x(t+1)-1) \quad (28)$$

is established, so that the formula (24) is established. Therefore, it is not necessary to calculate B(i, t, $\tau$) directly by using the equation (21), and it can be calculated as a sequel to B(i, t−1, $\tau$−2) on the basis of equation (24), and the amount of calculation may be greatly saved.

Figure 9:
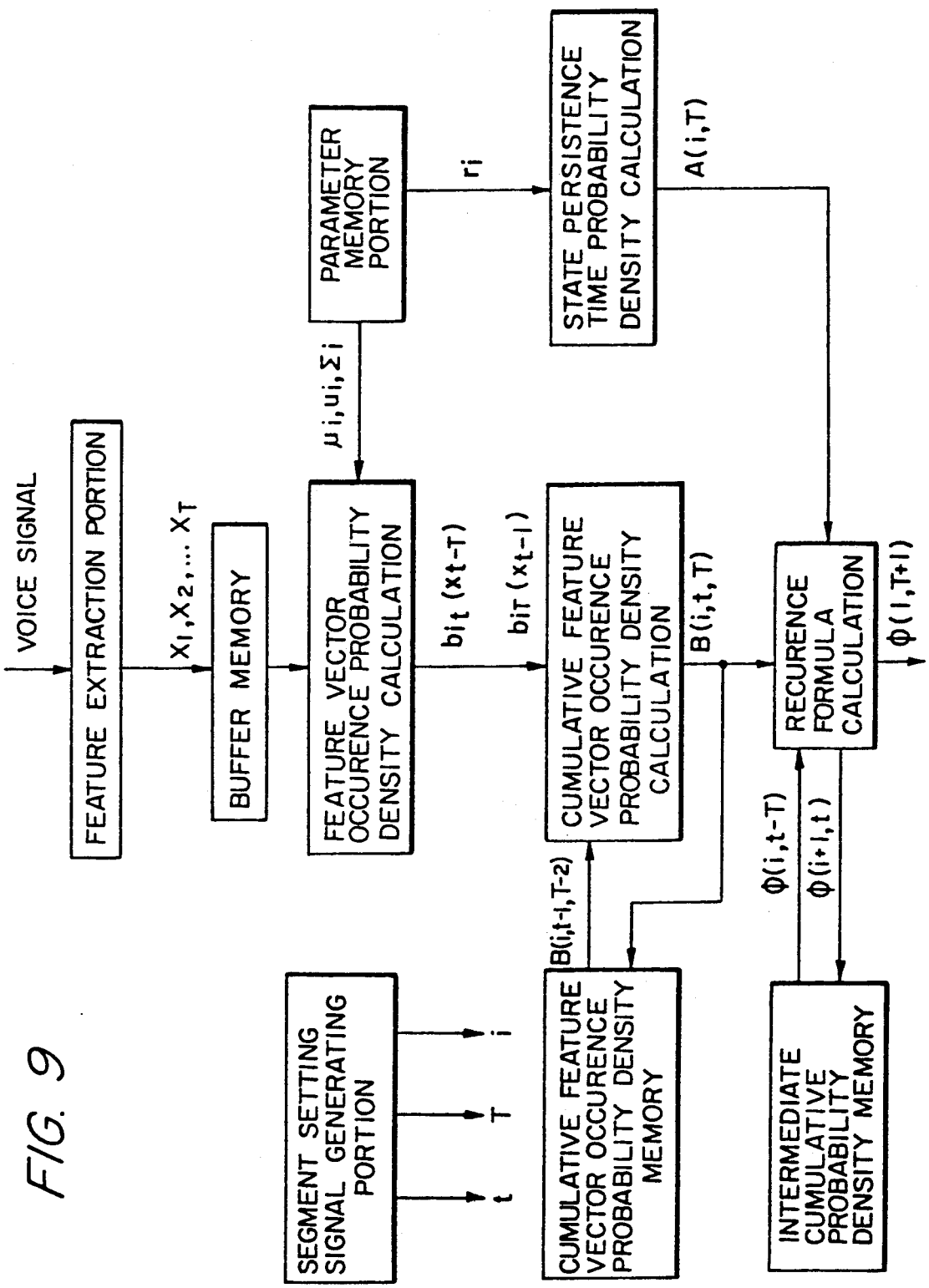
FIG. 9 shows an embodiment of the apparatus for calculating the degree of matching of the input pattern with respect to the HMM of this invention based on the principle explained in FIG. 8.

FIG. 9 shows an embodiment of the apparatus based on the above principle.

Numeral 901 is a feature extraction portion, in which an input voice signal is converted into a sequence of feature vectors $x_1, x_2, \ldots, x_T$. Numeral 902 is a buffer memory for temporarily storing the sequence of feature vectors $x_1, x_2, \ldots, x_T$. Numeral 903 is a feature vector occurrence probability density calculation part, in which the probability density $b_{i1}(x_{t-\tau})$, $b_{i\tau}(x_{t-1})$ of the feature vector $x_{t-\tau}$ and feature vector $x_{t-1}$ are calculated. Numeral 904 is a parameter memory part, in which the parameter of probability density function necessary for calculation of probability density is stored, that is, $\mu_i$, $u_i$, $\gamma_i$, $\Sigma_i$ at $i=1$ to I are stored. Numeral 905 is a cumulative feature vector occurrence probability density calculation part, in which B(i, t, $\tau$) is calculated according to equations (22), (23), (24). Numeral 906 is a cumulative feature vector occurrence probability density memory part, in which the result of calculation in the cumulative feature vector occurrence probability density calculation part is sequentially stored, and the content of the memory is read out to calculate the equations (22), (23), (24) in the cumulative feature vector occurrence probability density calculation part 905. Numeral 907 is a state persistence time probability density calculation part, in which the probability A(i, $\tau$) to set the length of the sequence of state i to be t, from the parameter for defining the probability density of the length of the sequence of the state i stored in the parameter memory part 904. Numeral 908 is a recurrence formula calculating part, in which the equation (19) is calculated with respect to $i=1$ to I, $t=1$ to T, finally determining $\phi(I,T+1)$. Numeral 909 is an intermediate cumulative probability density memory part, in which the intermediate cumulative probability density $\phi(i, t)$ calculated in the recurrence formula calculation part 908 according to the formula (19) is stored sequentially, and the stored intermediate cumulative probability density is used in the subsequent recurrence calculation in the recurrence formula calculating part 908. Numeral 910 is a segment setting signal generating part, in which the frame number t, state number i, and length $\tau$ of the sequence of state $q_i$ are set sequentially, and these values are supplied in individual blocks, and the processing stated above is effected on the values of i, t, $\tau$.

Thus obtained $\phi(I, T+1)$ gives the likelihood generated by the feature vector sequence $x_1, x_2, \ldots, x_T$ from the model $\lambda$.

Using this apparatus, the word voiced is recognized as follows.

The word to be recognized is supposed now to be w=1 to W, and it is assumed that a model $\lambda^w$ is prepared for word w. At this time, when $\phi(I, T+1)$ obtained exactly same as in the previous processing is written as $\phi^w(I,T+1)$ to the model $\lambda^w$, the result of recognition is $$w = \underset{w=1 \sim w}{\operatorname{argmax}} [\phi^w(I,T+1)] \quad (29)$$

By the logarithm of the both sides of the recurrence formula in equation (19), the equations (19), (22)~(27) may be transformed into equations (19'), (22') ~(27'), changing multiplications into additions.

However, in equations (19'), (22')~(27'), the following conditions are required.

$$\Phi(i,t) = \log \Phi(i,t)$$

$$\Theta(i,\tau) = \log \tau(i,\tau)$$

$$\Gamma(i,t,\tau) = \log B(i,t,\tau)$$

$$\Delta(i,\tau) = \log d(i,\tau)$$

Hence, $$\Phi(i+1,t) = \max_\tau [\Phi(i,t-\tau) + \Theta(i,\tau) + \Gamma(i,t,\tau)] \quad (19')$$

When $\tau=1, 2$, it follows that $$\Gamma(i,t,1) = \log bi_1(x_{t-1}) \quad (22')$$

When $\tau \geq 3$, we obtain $$(i,t,\tau) = \log bi_1(xt-\tau) + \Gamma(i,t-1,\tau-2) + \log bi_\tau(xt-1) \quad (24')$$

Besides, since $$\Delta(i,\tau) = \sum_{k=1}^{\tau} \log a_{ik-1ik} \quad (25')$$

$(a_{i\phi i1} = a_{i1i2} = 1)$, then
$$\Delta(i,\tau) = \Delta(i,\tau-1) + \log a_{i\tau-1i\tau} \quad (26')$$
$$\Theta(i,\tau) = \Delta(i,\tau) + \log(1 - a_{i\tau i\tau+1}) \quad (27')$$

In this embodiment, in FIG. 9, the calculation on each block corresponding to the equation (19), (22)~(27) is changed to the equations (19'), (22')~(27'), and the organization itself is exactly the same.

Incidentally, the state persistence time probability density calculation part 907 is to calculate the probability $A(i, \tau)$ or $\theta(i, \tau)$ of the length $\tau$ of the sequence of the state from the parameters of function in each state, and it may be replaced by a constitution in which the value of $A(i,\tau)$ or $0(i, \tau)$ corresponding to the values of i, $\tau$ is stored in the table, and the value of $A(i, \tau)$ or $0(i, \tau)$ corresponding to i, $\tau$ being set in the segment setting signal generation part 910 is searched.

Thus, according to this invention, in each state of the conventional HMM, it is possible to make an HMM in which the mean vector of the probability density function to give the occurrence probability of the feature vector in the same state may vary linearly depending on the length of the sequence of the state, and the precision of recognition can be enhanced. Besides, when this model is used, by making use of the nature of its features, it is possible to keep the quantity of calculation in recognition nearly at the same level as in the conventional HMM. In other words, without practically increasing the quantity of calculation, a high rate of recognition can be realized.

In this embodiment it is explained that the transition probability in same state is constant regardless of the number of staying times, but it is also possible, as a matter of course, to apply $A(i, \tau)$ in $\Gamma$-distribution or Poisson's distribution. In this case, the parameter of the assumed distribution is estimated from the training parameter, and it is obtained similarly in the method described in this invention. Since calculation of $$d_i(\tau) \prod_{k=1}^{\tau} b_{ik}(x_{t-\tau-1+k})$$

in equations (9) through (11) is $c_{t,\tau}(i)$, which is calculated by use of equations (22) through (27), calculation to obtain the above $P(X, s_{t-\tau}=i_1, s_t=j_1|\lambda)$ can be made considerably easier by use of this method.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A pattern recognition signal analysis apparatus for generating and storing an improved Hidden Markox Model (HMM), comprising:
   feature extraction means for converting an input signal into a sequence of feature vectors, one for each state;
   HMM creating means for making an HMM from said sequence of extracted feature vectors by calculating parameters for each said feature vector on the basis of previously-defined parameters to provide a mean vector representing the probability density function of each feature vector for each state, each said means vector varying with time within each state; and
   means employing said HMM for recognizing an unknown pattern.

2. The pattern recognition apparatus of claim 1, wherein said parameters for defining each said mean vector for a state (i) comprise:
   a neutral point vector $\mu_i$, a direction vector $u_i$, transition probability $\gamma_i$, and a covariance matrix $\Sigma_i$.

3. The pattern recognition apparatus of claim 2 further comprising:
   means employing the created HMM for recognizing an unknown input signal.

4. The pattern recognition apparatus of claim 2 wherein said HMM creating means calculates said parameters from a training pattern set made of a plurality of like training patterns.

5. The pattern recognition apparatus of claim 4 wherein said measn for recognizing an unknown input signal comprises:
   means for converting said unknown input signal into an observed sequence of feature vectors, one for each state; and
   means for calculating an observed mean vector representing the probability density function for each said feature vector for each state, each said observed mean vector varying with time within each state.

6. The pattern recognition apparatus of claim 5 wherein said means for recognizing further comprises:
means for calculating the likelihood in terms of a probability density function that said observed mean vector was generated by said HMM creating means.

7. A voice recognition apparatus using a plurality of Hidden Markov Models (HMM), each having a plurality of states, comprising:
feature extraction means for converting an input signal into a sequence of feature vectors;
HMM creating means for making a plurality of HMMs from the sequence of feature vectors, said HMM creating means utilizing at least one parameter for defining a mean vector in termsofa probability density function of the feature vector in each state, said mean vector varying with time in each state;
means for storing said plurality of HMMs; and
means connected to said storing means for receiving a series of unknown utterances and for employing the HMMs stored by said means for storing to determine the utterance most likely to correspond to said unknown utterance.

8. A method of speech pattern recognition employing a Hidden Markox Model (HMM), said model comprising a plurality of states, the steps comprising:
uttering a test word W for R times where R is an integer;
converting each utterance of the word W into a sequence of feature vectors;
storing each sequence of feature vectors in a memory;
determining the elements of a Markov model parameter set $\lambda_i$ utilizing said feature vector sequences, said step of determining including the determination of a neutral pint vector anda direction vector, the point vector and direction vector being related to a mean vector of a probability density function, said mean vector varying linearly with time for each state of said model;
storing said Markov model parameter set; and
employing the stored Markov model parameter set in selecting a speech pattern most likely to correspond to an unknown speech pattern.

9. A pattern recognition apparatus using a plurality of Hidden Markov Models (HMM) each having a plurality of states, comprising:
feature extraction means for converting an input signal into a sequence of feature vectors; and
HMM creating means for making an HMM from the sequence of feature vectors utilizing at least one parameter for defining a probability density function of the feature vector in each state, the probability density function comprising a mean vector varying with time in each state; and
means employing said HMM for recognizing an unknown pattern.

10. The apparatus of claim 9 wherein said mean vector varies linearly with respect to time in each state.

11. The apparatus of claim 10 wherein said probability density function further includes a term comprising a covariance matrix which is constant in time in each state.

12. The apparatus of claim 10 wherein said mean vector comprises a neutral point vector and a direction vector.

13. The apparatus of claim 9 wherein, in the course of making an HMM, said HMM creating means estimates a mean vector, said mean vector varying with time in each state.

14. The apparatus of claim 13 wherein, in the course of making an HMM, said HMM creating means further estimates a covariance matrix which is constant in each state.

15. The apparatus of claim 14 wherein said HMM creating means estimates said mean vector by deriving an estimate of a neutral point vector and a direction vector.

16. In a method of deriving a Hidden Markov Models (HMM) for speech pattern recognition, said model comprising a plurality of states, the steps comprising:
uttering a word W for R times where R is an integer;
converting each utterance of the word W into a sequence of feature vectors;
storing each sequence of feature vectors in a memory; and
calculating a Markov model parameter set $\lambda_i$ utilizing said feature vector sequences, said step of calculating including the determination of a neutral point vector and a direction vector, the neutral point vector and direction vector being related to a mean vector of a probability density function, said mean vector varying linearly with time for each state of said model.

* * * * *